United States Patent [19]
Whorton, III

[11] Patent Number: 4,886,286
[45] Date of Patent: Dec. 12, 1989

[54] PORTABLE CONCESSION STAND

[76] Inventor: Robert B. Whorton, III, 4448 Grissom Rd., Spartanburg, S.C. 29301

[21] Appl. No.: 929,757

[22] Filed: Nov. 12, 1986

[51] Int. Cl.$^4$ .............................................. B62B 3/00
[52] U.S. Cl. .............................. 280/47.35; 280/79.11; 188/5
[58] Field of Search ............ 280/47.34, 47.35, 79.1 R, 280/79.1 A, 79.2, 79.3; 188/5, 7, 10

[56] References Cited

U.S. PATENT DOCUMENTS

| | | | |
|---|---|---|---|
| D. 182,716 | 5/1958 | Ferguson | 280/47.34 |
| 2,845,780 | 8/1958 | Conklin et al. | 280/79.3 |
| 3,307,658 | 3/1967 | Stevenson | 188/5 |
| 3,472,392 | 10/1969 | Hahn | 280/47.35 |
| 4,073,369 | 2/1978 | Nordskog | 188/5 |
| 4,302,025 | 11/1981 | Waddel et al. | 280/79.14 |

OTHER PUBLICATIONS

Bassick Division Stewart Warner Corp.—Position Floor Locks, sales catalog (pp. 56, 57).
Lee Engineering Co., Inc., Pawtucket, RI Presto Heavy Duty Floor Locks, sales brochure (1 page—both sides).
Hamilton/Floor Truck Locks, sales catalog (p. 47), The Hamilton Coaster and Manufacturing Co.
Faultless Caster Corporation sales catalog (p. 40).
The Fairbanks Co "Stem Casters—Lockweld", sales catalog (p. 16).
Payson Casters Inc., "Floor Locks", sales catalog (p. 50).

*Primary Examiner*—Charles A. Marmor
*Assistant Examiner*—Richard Camby
*Attorney, Agent, or Firm*—Dority & Manning

[57] ABSTRACT

A portable concession stand for transporting drinks, snacks, sundry items, and the like across a transport surface from one place to another. The portable concession stand includes a box-like container structure constructed of extruded tubing having composite panels mounted thereon for partially enclosing the container structure. Handles are attached to the portable concession stand for guidance and control thereof. Associated with at least one handle is a brake lever which actuates a brake assembly located on the bottom surface of the portable concession stand. When the brake lever is released, the brake assembly moves from a retracted position to an intermediate braking position under the influence of a spring biasing element, which causes the brake assembly to limit movement of the portable concession stand. The brake lever can be moved to a lower-most position for causing the brake assembly to assume an extended locking configuration for preventing further movement of the portable concession stand.

1 Claim, 3 Drawing Sheets

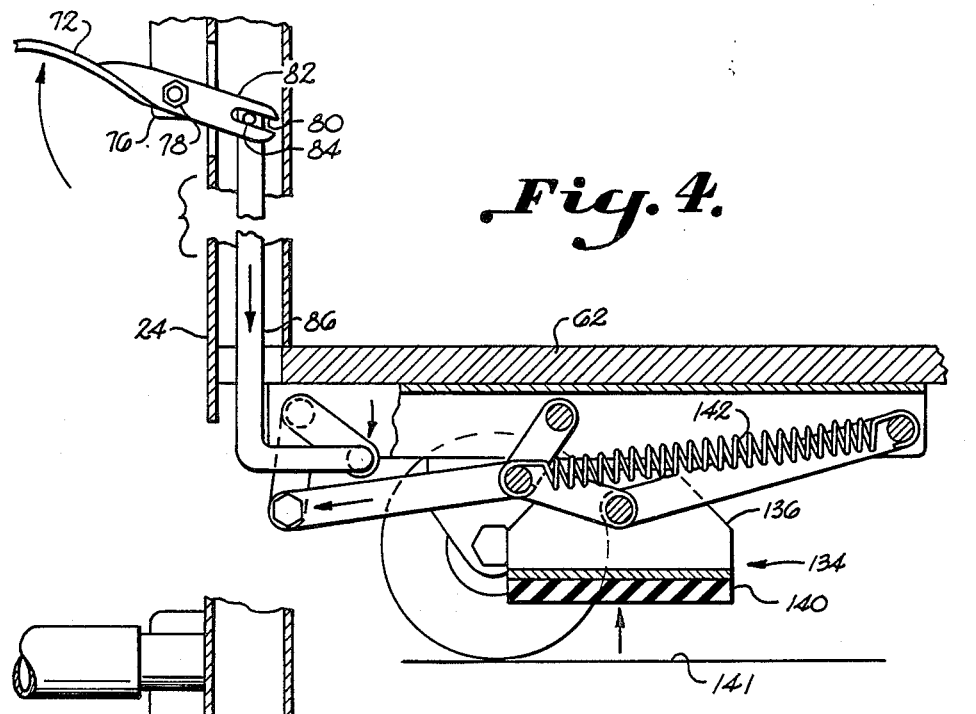
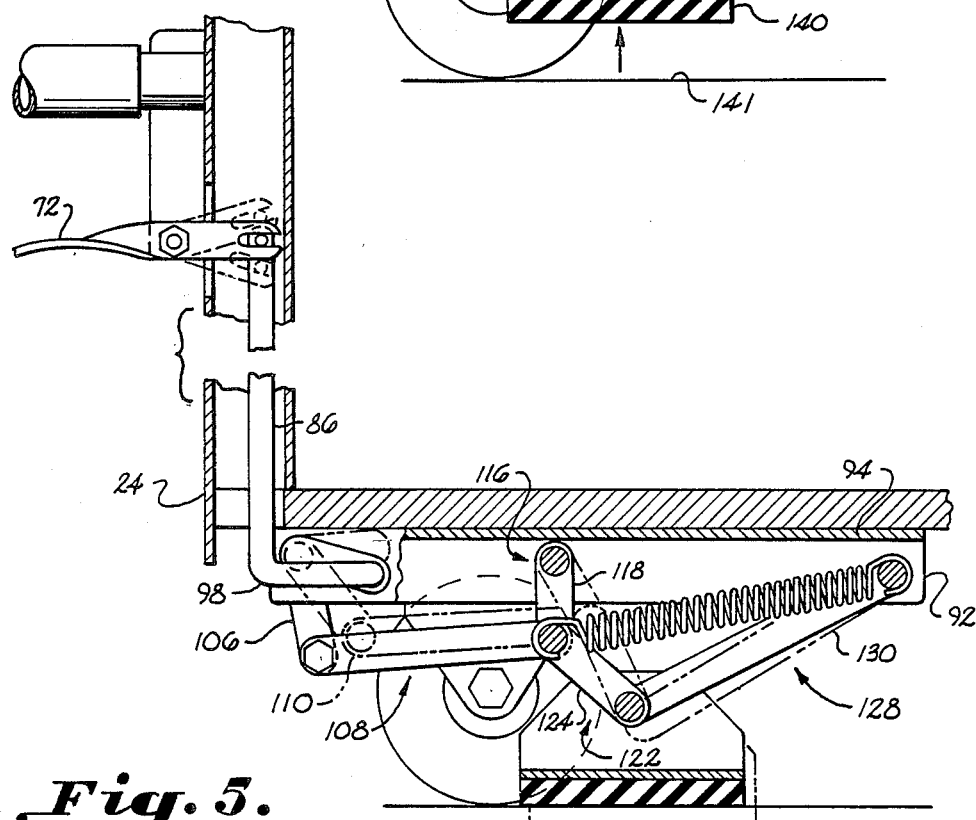

PORTABLE CONCESSION STAND

BACKGROUND OF THE INVENTION

The present invention relates to a portable concession stand having a combination braking and floor locking assembly.

A common method for selling items such as drinks, snacks, sundry items, and the like to audiences at sports events, fairs, amusement parks, etc., is typically accomplished by a hawker or vendor carrying the items in a tray or box through the crowd and selling the items therefrom to patrons. The vendor typically wears a money pouch and/or a change making device for holding the cash received from the patrons for the items sold. Because the vendor must hand-carry the items, the amount of items available for sale by the vendor at any given time is limited.

Where a suitable surface is available, a rollaround refreshment cart or concession stand mounted on wheels can be utilized which enables the amount of items available for sale by the vendor at any given time to be greatly increased. A portable concession stand can also be provided a cash drawer, thereby eliminating the need for the hawker to wear a money pouch and/or a change making device. Exterior sidewalls can be provided a portable concession stand which can supply surfaces suitable for advertising logos, menus, prices, etc. Moreover, the sidewalls of the portable concession stand can be provided insulation for maintaining the drinks, snacks, and the like, at a predetermined temperature with better results than is typically achievable with conventional hand-carried boxes and trays.

Because the portable concession stand is mounted on wheels, it would be desirable to provide the portable concession stand with a brake and/or locking means which would allow movement of the concession cart to be selectively restrained. However, for roll-around structures, the conventional commercially available floor locks, such as the Faultless FTL46 (27542), manufactured by Faultless Caster Corporation of Evansville, Ind., are foot-operated and are heavier and bulkier than is desirable. Further, because such commercially available floor locks are foot operated, such floor locks are not as easy to operate as would be a floor lock which could be actuated by hand. A foot operated floor lock may require the vendor to take his eyes off the crowd and off of the items he is selling, whereas a hand operated floor lock probably would not.

It would also be desirable to have a device whereby the portable concession stand could be braked for temporarily restraining movement thereof, so as to provide more control over the movement of the portable concession stand. Such a braking device would be most advantageously utilized if a "dead man" feature was provided so that should the vendor let go of the portable concession stand, the braking device would automatically be actuated to apply a braking force to restrain the portable concession stand from further movement.

SUMMARY OF THE INVENTION

It is therefor an object of the present invention to provide a movable cart for transporting objects across a surface which can be selectively locked to prevent movement across the surface.

Another object of the present invention is to provide a movable cart for transporting objects across a surface which can be selectively braked to restrain the movement thereof across the surface.

Another object of the present invention is to provide a portable concession stand having a hand-actuated combination braking and floor locking assembly.

Another object of the present invention is to provide a braking assembly having a surface engagement means movable from a retracted position to an intermediate braking position and to an extended locking position.

Still another object of the present invention is to provide a light-weight portable concession stand which can be easily maneuvered and maintained.

Yet another object of the present invention is to provide a portable concession stand having a braking device which is automatically actuated upon the portable concession stand becoming unattended.

Generally, these and other objects are attained by the present invention, which relates to a movable cart for transporting objects across a surface. The movable cart comprises a plurality of frame members constructed together to define a generally rectangularly-shaped frame structure. A plurality of panel members are attached to the generally rectangularly-shaped frame structure to create a generally rectangularly-shaped box-like structure defining an interior portion, an exterior portion, a top surface, and a bottom surface. Each of the plurality of panel members has an inner sheet member, an outer sheet member, and a core material disposed therebetween to which the inner sheet member and the outer sheet member are bonded. A plurality of generally rectangularly-shaped trays are provided, each having a plurality of openings defined therein, the openings being for receipt of the objects. A plurality of extruded tray support members are attached to the plurality of panel members in the interior portion of the generally rectangularly-shaped box-like structure for supporting the plurality of generally rectangularly-shaped trays thereon. A plurality of rollers are associated with the bottom surface of the generally rectangularly-shaped box-like structure on which the movable cart may be transported across the surface through rolling motion of the plurality of rollers. And, at least one handle is associated with the generally rectangularly-shaped frame structure for grasping and guiding the movable cart.

The movable cart may further comprise a pivotable brake lever associated with the at least one handle. A brake assembly is associated with the bottom surface of the generally rectangularly-shaped box-like structure, the brake assembly selectively frictionally engaging the surface across which the movable cart is transported upon actuation thereof for allowing the movement of the movable cart across the surface to be restrained. And, a longitudinally-extending connecting member is pivotally connected to both the pivotable brake lever and the brake assembly, the longitudinally-extending connecting member moving substantially rectilinearly upon pivoting of the pivotable brake lever to actuate the brake assembly.

In the preferred embodiment of the present invention, the braking assembly comprises a brake frame structure and a transfer means associated with the brake frame structure and the longitudinally-extending connecting member. The transfer means is mounted for movement responsive to the substantially rectilinear movement of the longitudinally-extending connecting member. Linkage means are associated with the transfer means for movement responsive to the movement of the transfer means. A surface engagement means is associated with the linkage means for engaging the surface on which the movable cart is transported. The surface engagement means is movable to a retracted position adjacent the brake frame structure, to an extending locking position distal from the brake frame structure, and to an intermediate braking position between the retracted position and the extended locking position. The movement of the surface engagement means between the intermediate braking position and the extended locking position is effected by movement of the linkage means.

The surface engagement means preferably includes a foot member pivotally associated with both the third linkage assembly and the fourth linkage assembly for movement therewith, the foot member having a bottom attachment surface. A resilient member is attached to the bottom attachment surface of the foot member for frictionally engaging the surface relative to which the movable structure moves.

BRIEF DESCRIPTION OF THE DRAWINGS

The foregoing as well as other objects of the present invention will be more apparent from the following detailed description of the preferred embodiment of the invention when taken together with the accompanying drawings, in which:

FIG. 4 is a partial side elevational sectional view of a braking assembly constructed in accordance with the present invention, the braking assembly being in a retracted position; and FIG. 5 is a partial side elevational sectional view of a braking assembly constructed in accordance with the present invention and illustrates in solid lines the braking assembly in an intermediate braking position, and in phantom lines, the braking assembly in an extended locking position.

DESCRIPTION OF THE INVENTION

Figure 1:
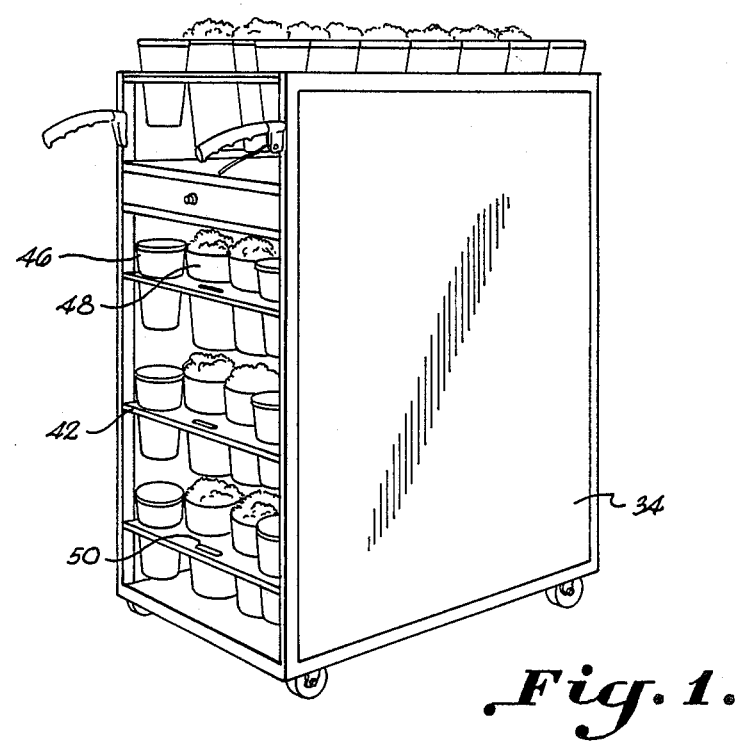
FIGS. 1 and 2 are perspective views of a preferred form of a portable concession stand constructed in accordance with the present invention.
Figure 2:
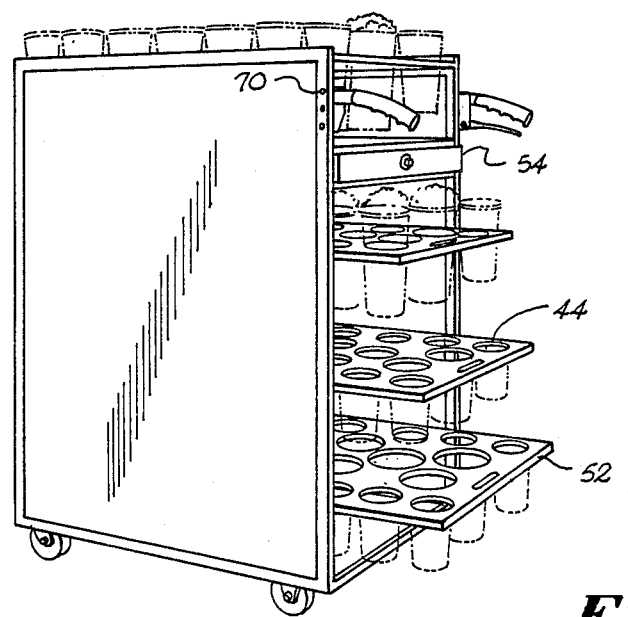

Referring to the drawings in detail, wherein like reference characters represent like elements throughout the various views, the portable concession stand of the present invention is designated generally by the reference character 10. As shown in FIGS. 1 and 2, portable concession stand 10 includes a generally rectangularly-shaped, box-like container structure 12 and a brake assembly 16 associated container structure 12.

Container structure 12 includes a generally rectangularly-shaped frame structure 18 constructed from extruded tubular frame members 20, 22, 24, 26. Outwardly extending flanges 28 are provided extruded tubular frame members 20, 22, and 24 for retaining panels 30 to frame structure 18.

Panels 30 are of composite construction. Each panel 30 includes an inner sheet 32, an outer sheet 34, and a core material disposed therebetween (not shown). Inner and outer sheets 32, 34 are preferably constructed of aluminum, although any other suitable metal, plastic, or other sheet material could be used. The core material is preferably constructed of either phenolic impregnated paper honeycomb material, polyurethane foam material, or any other suitable material. Inner and outer sheets 32, 34 are bonded to the core material using conventional adhesives and/or other fastening means. As a result of the composite construction, panels 30 are strong and rigid but also relatively light weight. Where it is desirable for portable concession cart 10 to have insulating capabilities, the core material is preferably constructed of polyurethane foam.

Panels 30 are retained in frame structure 18 by outwardly projecting flange portions 28, which are provided the length of extruded tubular frame members 20, 22, and 24. Other suitable fastening means such as rivets, screws, nuts and bolts, etc., could also be used to fasten panels 30 within frame structure 18.

Attached in the interior of portable concession stand 10 are a plurality of longitudinally extending extruded tray support members 38 which extend substantially the depth of the interior of container structure 12. Tray support members 38 are preferably constructed of aluminum, although any other suitable metal, plastic, or other material could also be used. Tray support members 38 have an extruded cross-sectional profile which is smoothly curved along the length thereof to provide ease of cleaning and to prevent crack and crevice contamination from arising should spillage of the concession items occur. Tray support members 38 are preferably attached to the inner sheets 32 of panels 30 by rivets 40.

A plurality of generally rectangularly-shaped trays 42 are provided portable concession stand 10. Openings 44 are provided in trays 42 for receiving drink containers 46 and popcorn containers 48. Openings 44 are of a generally circular shape for receipt of containers 46, 48. It is to be understood that containers 46, 48 are shown for illustrative purposes only, and that trays 42 could be used to carry a variety of items. Accordingly, although openings 44 are illustrated for accommodating containers 46, 48, openings 44 could be of a variety of geometric shapes, depending on the items which trays 42 are to carry. Handle openings 50 are provided trays 42 to aid in inserting trays 42 into the interior portion of portable concession stand 10 and also for removal therefrom. Downwardly extending edges 52 are provided the periphery of trays 42 for facilitating sliding of trays 42 on tray support members 38 and/or for providing added rigidity and strength to trays 42.

A cash drawer 54 is provided in the interior portion of the container structure 12 of portable concession stand 10 and is slidingly movable to a position within and to a position without the interior portion of portable concession stand 10. Cash drawer 54 is provided with a conventional drawer glide assembly (not shown) comprised of rollers and channels carried by portable concession stand 10 for engaging longitudinally extending channels provided on the sides of cash drawer 54. A conventional locking unit 56 is provided cash drawer 54 for selectively locking cash drawer 54 within the interior portion of portable concession stand 10.

Figure 3:
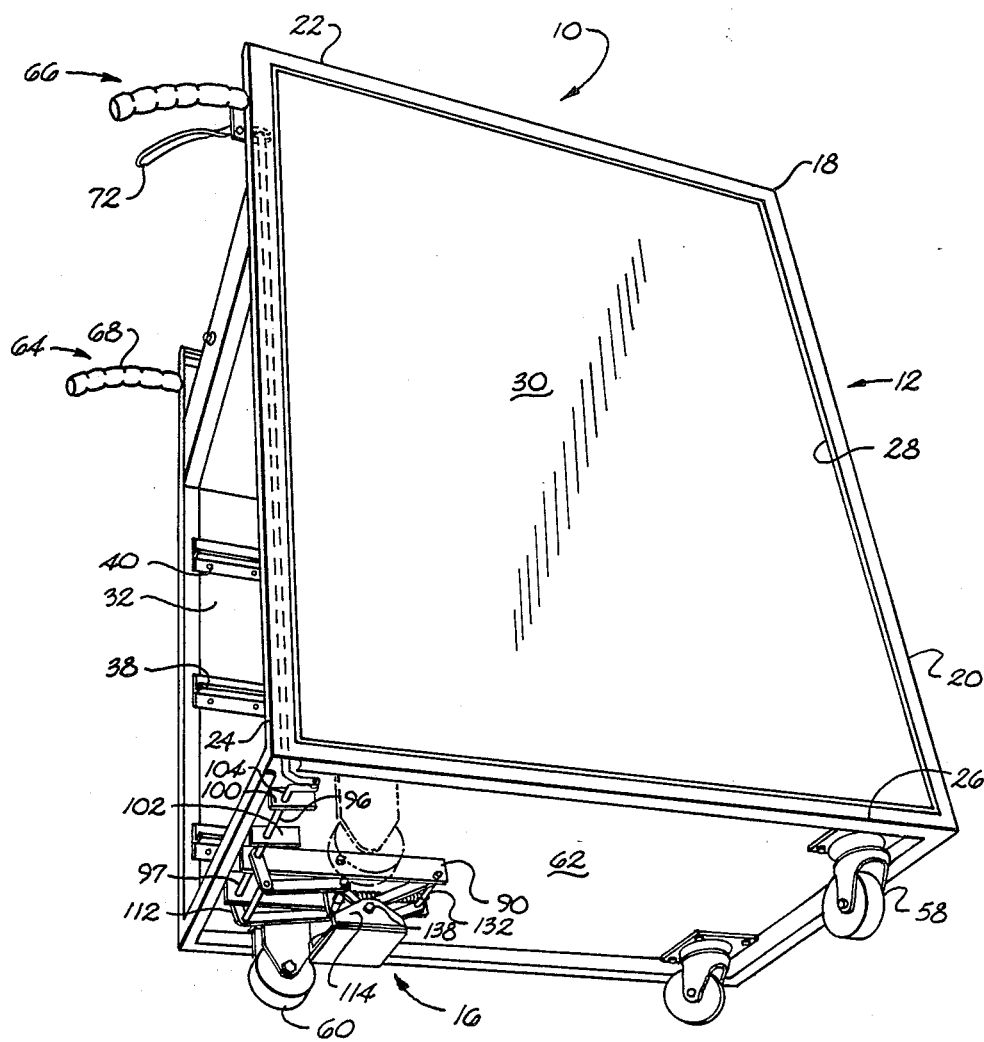
FIG. 3 is a perspective view of a preferred form of a portable concession stand and braking assembly therefor constructed in accordance with the present invention.

As shown in FIG. 3, a plurality of rollers, wheels, or casters 58, 60 are provided on the bottom surface 62 of the container structure 12 of the portable concession stand 10. Casters 58, 60 allow for portable concession stand 10 to be transported across a transport surface through the rolling motion thereof. Casters 58, 60 can be sized according to the type of transport surface or terrain over which portable concession stand 10 is to travel. Preferably, caster 58 on the front end of portable concession stand 10 are turnable or swivelable to allow portable concession stand 10 to be easily turned and maneuvered. Casters 60 on the rear end of portable concession stand 10 preferably do not swivel. Casters 58, 60 are of conventional construction, but any other suitable rolling means could also be provided the bottom surface 62 of portable concession stand 10 if desired.

Two outwardly projecting handles 64, 66 are provided the upper rear portion of portable concession stand 10, each handle 64, 66 having a hand-grip 68 provided thereon. Handles 64, 66 are grasped by the operator of portable concession stand 10 to push, pull, maneuver, and generally control the motion of portable concession stand 10. Handles 64, 66 are attached to extruded tubular frame members 24 by screws 70 or by any other suitable fastening members such as bolts, rivets, or the like.

Extending below handle 66 is a pivotally mounted brake lever 72. Brake lever 72 is pivotally mounted onto handle bracket 74 with a pivotal connector 76. Pivotal connector 76 comprises a nut and bolt combination 78 having washers, preferably nylon, disposed on either side of brake lever 72 to allow easy pivotal movement of brake lever 72. An open-ended slot 80 is provided in an end 82 of brake lever 72 for receiving a pin 84. Pin 84 is fixedly attached to a longitudinally extending connecting rod 86 which is carried for rectilinear movement within an extruded tubular member 24, as shown in FIG. 4. Connecting rod 86 moves substantially rectilinearly responsive to the sliding movement of pin 84 in slot 80 caused by the pivoting of brake lever 72.

A brake assembly 16 is provided the bottom surface 62 of portable concession stand 10, as shown in FIGS. 3, 4 and 5. Brake assembly 16 includes a brake frame structure 90 which is generally U-shaped, having downwardly extending brake frame flanges 92 and a web portion 94 spanning therebetween. Web portion 94 is attached to bottom surface 62 of container structure 12 by bolts (not shown) or any other suitable fastening means such as rivets and/or screws.

A transfer member 96 extends transversely across bottom surface 62 of container structure 12, adjacent the rearward portion of portable concession stand 10. Transfer member 96 extends through a rearward portion of brake frame flanges 92 and is carried therein for pivotal movement. Nylon bushings (not shown) are provided in openings 97 of brake frame flanges 92 through which transfer member 96 extends to facilitate the pivotal movement of transfer member 96. Transfer member 96 is pivotally connected at one end to an L-shaped projection 98 provided on the lower end of connecting rod 86. A washer (not shown), preferably constructed of nylon, is provided at the pivotal connection of transfer member 96 and L-shaped projection 98. Thus, through pivotal movement of brake lever 72, connecting rod 86 is moved substantially rectilinearly, thereby causing L-shaped projection 98 adjacent bottom surface 62 of portable concession stand 10 to move. Movement of L-shaped projection 98 in turn causes pivotal movement of transfer member 96 within brake frame structure 90.

Mounted between brake frame structure 90 and the connection of transfer member 96 and L-shaped projection 98 is a transfer member bracket 100. Transfer bracket member 100 is also generally U-shaped and has downwardly extending transfer member bracket flanges 102 having openings 104 through which transfer member 96 extends for pivotal movement therein. Attached to and outwardly projecting from transfer member 96 are transfer member arms 106.

Transfer member arms 106 are pivotally connected with pivotal connectors to a first linkage assembly 108. First linkage assembly 108 moves in response to the pivoting of transfer member arms 106 of transfer member 96.

First linkage assembly 108 includes two first linkage assembly bars 110 which extend substantially parallel to one another and which are spaced apart at one end by a rearward first linkage assembly spacer 112 and at the other end by a forward first linkage assembly spacer 114.

Connected to first linkage assembly 108, opposite the connection of first linkage assembly 108 to transfer member arms 106, is a second linkage assembly 116, only a portion of which is illustrated for clarity. Second linkage assembly 116 includes two second linkage assembly bars 118 (only one is shown for clarity) spaced substantially parallel and apart from one another by a hollow, substantially cylindrical second linkage assembly spacer (not shown) at one end and by forward first linkage assembly spacer 114 at the other end. Opposite where second linkage assembly 116 is pivotally attached to first linkage assembly 108 (nylon washers preferably being provided at the connection thereof to facilitate relative pivotal movement therebetween), second linkage assembly 116 is pivotally attached with pivotal connectors to brake frame flanges 92 of brake frame structure 90. The second linkage assembly is thus pivotally connected to both brake frame structure 90 and to first linkage assembly 108, the second linkage assembly moving responsive to movement of first linkage assembly 108.

A third linkage assembly 122 is pivotally connected to the junction of first linkage assembly 108 and second linkage assembly 116 and includes two third linkage assembly bars 124 which extend substantially parallel to one another and which are spaced apart by forward first linkage assembly spacer 114 on one end and by a hollow, substantially cylindrical third linkage assembly spacer (not shown) at the other end. As with other pivotal connections of portable concession stand 10, the pivotal connections relating to third linkage assembly 122 are also provided with washers, preferably nylon, for facilitating pivotal movement of third linkage assembly 122.

Pivotally connected to third linkage assembly 122 at the other end thereof is fourth linkage assembly 128. Fourth linkage assembly 128 includes two fourth linkage assembly bars 130 which extend substantially parallel to one another and which are spaced apart by the third linkage assembly spacer at one end and by fourth linkage assembly spacer 132 at the other end thereof. Opposite the end of fourth linkage assembly 128 which is pivotally connected to third linkage assembly 122, fourth linkage assembly 128 is pivotally connected to brake frame flanges 92 of brake frame structure 90. Fourth linkage assembly 128 moves responsive to the movement of third linkage assembly 122.

A foot member 134 is attached at a junction of third linkage assembly 122 and fourth linkage assembly 128. Foot member 134 is generally U-shaped having upwardly extending foot member flanges 136 which are pivotally connected by bolt 138 to the above-mentioned junction of third linkage assembly 122 and fourth linkage assembly 128. Foot member 134 is provided on a bottom surface thereof a resilient member 140 for frictionally engaging the transport surface 141 across which portable concession stand 10 is movable. Resilient member 140 acts to provide a braking action for portable concession stand 10 when brake assembly 16 is in an intermediate braking position, as shown by the solid line representation of brake assembly 16 in FIG. 5. Resilient member 140 is preferably constructed of rubber, although any other suitable material such as plastic, metal, wood, or the like can be provided for frictional engagement of transport surface 141.

A spring element 142 is preferably connected between third linkage assembly spacer 126 and fourth linkage assembly spacer 132. Spring element 142 is illustrated as a coil spring, but could be any suitable member having elastic biasing characteristics, such as a rubber member, piston/cylinder arrangement, etc. Spring element 142 biases foot member 134 towards the intermediate braking position. Spring element 142 automatically applies resilient member 140 against transport surface 141 when brake lever 72 is released and allowed to assume its natural position. Thus, should the operator of portable concession stand 10 let go of portable concession stand 10, portable concession stand 10 would automatically be stopped from further movement due to the automatic actuation of brake assembly 16 and the corresponding engagement of resilient member 140 with transport surface 141, thereby providing an important safety feature. Although spring element 142 is illustrated as being a coil spring connected between third linkage assembly spacer 126 and fourth linkage assembly spacer 132, spring element 142 could be any suitable biasing element mounted such that foot member 134 is biased towards the intermediate braking position.

The operator of portable concession stand 10 can selectively activate braking assembly 16 by merely releasing his or her grip on brake lever 72 for allowing brake lever 72 to assume a natural position thereof, as biased thereto by spring element 142. As shown in FIG. 4, when the operator grasps brake lever 72 and pulls it to the upper most position thereof, foot member 134 and resilient member 140 attached thereon are in a retracted position up and away from transport surface 141. In this retracted position, portable concession stand 10 may be freely rolled about.

Upon movement thereof, first linkage assembly bars 110 cause second linkage assembly bars 118 to pivot through a larger arc than do transfer member arms 106. Such allows for the pivotal movement of transfer member arms 106 to be multiplied, thereby allowing for a wider range of vertical movement for foot member 134.

Brake assembly 16 may also be moved into an extended locking position by moving brake lever 72 to its lower-most position, below the position naturally assumed by brake lever 72 under the influence of spring element 142. Upon being moved to this lower-most position, brake lever 72, through corresponding movement of connecting rod 86 and brake assembly 16, causes foot member 134 and resilient member 140 attached thereon to be moved downwardly to an extent such that casters 60 are lifted slightly off transport surface 141. When in this extended locking position, brake assembly 16 is in an over-center position where second linkage assembly bars 118 and third linkage assembly bars 124 are generally in alignment with one another but are, strictly speaking, inclined at an obtuse angle with respect to one another as shown by the phantom lines in FIG. 5. In the over-center position, second linkage assembly bars 118, third linkage bars 124, and the pivotal connection therebetween are pointed towards the pivotal connection of fourth linkage assembly bars 130 and brake frame flanges 92 of brake frame structure 92. This overcenter configuration of brake assembly 16 allows foot member 134 to withstand great force perpendicular thereto without causing brake assembly 16 to return to its intermediate braking position. The extended locking position of brake assembly 16 in the overcenter configuration is illustrated by the phantom lines in FIG. 5.

After brake assembly 16 has been moved to the over-center extended locking position, portable concession stand 10 can no longer be rolled in either a forward or backward direction until the over-center extended locking position has been eliminated by the moving of brake lever 72 upwardly, thereby causing second linkage assembly bars 118 and third linkage assembly bars 124 to become reversed in angle with respect to one another, relative to the over-center configuration.

Because open-ended slot 80 of brake lever 72, cooperating pin 84 of connecting rod 86, and connecting rod 86 itself are housed inside extruded tubular member 24, unsightly and bothersome external linkage components are eliminated. The aforementioned openended slot 80/pin 84 arrangement facilitates shipping of portable concession stand 10 without brake lever 72 and handles 64, 66 attached and also the subsequent assembly of brake lever 72 to connecting rod 86 and handles 64, 66 to container structure 12.

Brake lever 72, connecting rod 86, transfer member 96, and brake assembly 16 are preferably constructed of steel, although any other suitable metal, plastic or other material could also be used.

An example of some of the dimensions of a brake assembly constructed in accordance with the present invention are set forth below. Using bottom surface 62 of container structure 12 as a reference plane, the distance from bottom surface 62 to the center line of transfer member 96 is approximately 7/16 of an inch. The distance between bottom surface 62 and the junction where second linkage assembly is connected to brake frame flanges 92 is approximately 7/16 of an inch. The distance between bottom surface 62 and the center line of where fourth linkage assembly 128 is connected to brake frame flanges 92 is approximately 9/16 of an inch. The distance between the center line of transfer member 96 and the center line of the junction between transfer member arms 106 and first linkage assembly 108 is approximately 1⅜ inches.

Setting forth dimensions of the linkage assemblies, the distance between the center line of where first linkage assembly 108 is connected to transfer member arms 106 and the center line of where first linkage assembly 108 is connected to second linkage assembly 116 is approximately 3⅛ inches. The distance between the center lines of where second linkage assembly 116 is attached to brake frame flanges 92 and to first linkage assembly 108 is approximately 1 inch, a distance equal to what is herein set forth as L. The distance between the center lines of where third linkage assembly 122 is attached to second linkage assembly 16 and to foot member 134 is approximately 1⅜ inches. The distance between the center lines of where fourth linkage assembly 128 attaches to brake frame flanges 92 and to foot member 134 is approximately 3⅞ inches.

Because the dimension L set forth above regarding the distance between the center lines of where second linkage assembly 116 is attached to brake frame flanges 92 and to first linkage assembly 100 is approximately 1 inch, the remaining above distances can be expressed in terms of L by merely substituting L for inches. This allows the dimensions of brake assembly 16 to be readily modified, by using the dimension L, according to the size brake assembly 16 required while maintaining the same dimensional relationships between the various linkages of brake assembly 16 relative to the dimension L, thereby insuring proper operation of the modified brake assembly 16.

While the preferred embodiment of the invention has been described using specific terms, such descriptions are for illustrative purposes only, and it is to be understood that changes and variations may be made without departing from the spirit or scope of the following claims.

What is claim:

1. A movable concession cart for transporting containers across a transport surface from one place to another, the movable concession cart comprising:

a plurality of extruded tubular metal frame members; said plurality of extruded tubular metal frame members being constructed together to create a generally rectangularly-shaped frame structure;

a plurality of panel members attached to said frame structure to create a generally rectangularly-shaped box-like structure defining an interior portion, an exterior portion, a top surface, and a bottom surface; each of said plurality of panel members having an inner sheet member, an outer sheet member, and a core material disposed therebetween to which said inner sheet member and said outer sheet member are bonded;

a plurality of generally rectangularly-shaped trays, each having a plurality of openings defined therein for receipt of said containers;

a plurality of extruded tray support members provided in said interior portion of said generally rectangularly-shaped box-like structure for supporting said plurality of generally rectangularly-shaped trays thereon;

a cash drawer provided in said interior portion of said generally rectangularly-shaped box-like structure, said cash drawer being slidingly movable to a position within and to a position without said interior portion of said generally rectangularly-shaped box-like structure;

a plurality of rollers provided on said bottom surface of said generally rectangularly-shaped box-like structure on which the concession cart may be transported across the transport surface through rolling motion of said plurality of rollers;

at least one cart handle associated with said generally rectangularly-shaped frame structure for grasping and guiding the movable concession cart;

a pivotable brake lever associated with said at least one of said plurality of cart handles;

a longitudinally-extending connecting member pivotally connected to said pivotable brake lever, said longitudinally-extending connecting member moving substantially rectilinearly responsive to pivoting of said pivotable brake lever;

a brake assembly associated with said bottom surface of said generally rectangularly-shaped box-like structure, said brake assembly including:

(i) a brake frame structure;

(ii) a transfer member associated with said brake frame structure and pivotally connected to said longitudinally-extending connecting member, said transfer member pivoting responsive to said substantially rectilinear movement of said longitudinally-extending connecting member;

(iii) a first linkage assembly pivotally connected to said transfer member for movement responsive to pivoting of said transfer member;

(iv) a second linkage assembly pivotally connected to said brake frame structure and pivotally connected to said first linkage assembly for pivotal movement responsive to movement of said first linkage assembly;

(v) a third linkage assembly pivotally connected to said first linkage assembly for movement responsive to movement of said first linkage assembly;

(vi) a fourth linkage assembly pivotally connected to said brake frame structure and pivotally connected to said third linkage assembly for movement responsive to movement of said third linkage assembly;

(vii) a foot member associated with said third linkage assembly and said fourth linkage assembly, said foot member being movable to a retracted position adjacent said brake frame structure, to an extended locking position distal from said brake frame structure, and to an intermediate braking position between said retracted position and said extended locking position; said movement of said foot member between said retracted position, said intermediate braking position and said extended locking position being effected by movement of said third linkage assembly and said fourth linkage assembly;

(viii) a resilient member attached to said foot member for frictionally engaging the transport surface across which the movable concession cart is movable to provide a braking action for the movable concession cart when said foot member is in said intermediate braking position;

(ix) a biasing element associated with said first linkage assembly, said biasing element biasing said foot member towards said intermediate braking position; said connecting member being movable substantially rectilinearly in a predetermined manner for overcoming said biasing of said foot member by said biasing element for causing said foot member to move to said retracted position adjacent said brake frame structure; and (x) said foot member being movable to said extended locking position for causing said resilient member to statically engage the transport surface across which the movable concession cart moves to prevent movement of the movable concession cart relative to the transport surface.

* * * * *